P. WEST.
VEHICLE CUSHIONING DEVICE.
APPLICATION FILED DEC. 27, 1910.
988,417.
Patented Apr. 4, 1911.
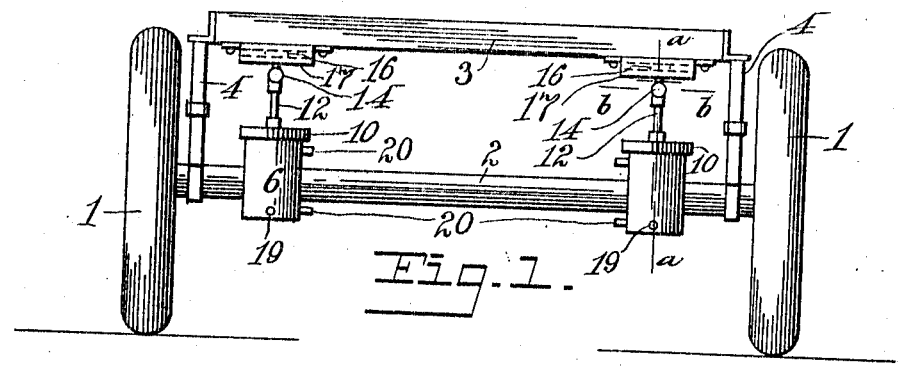
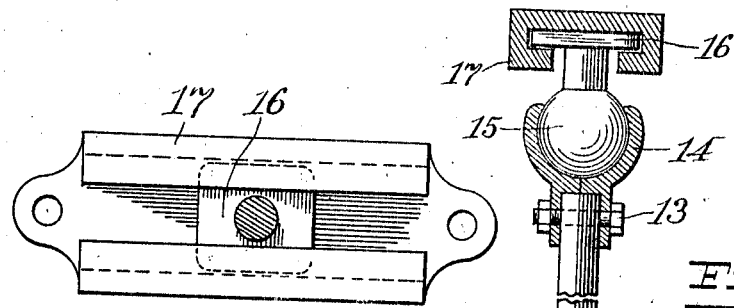
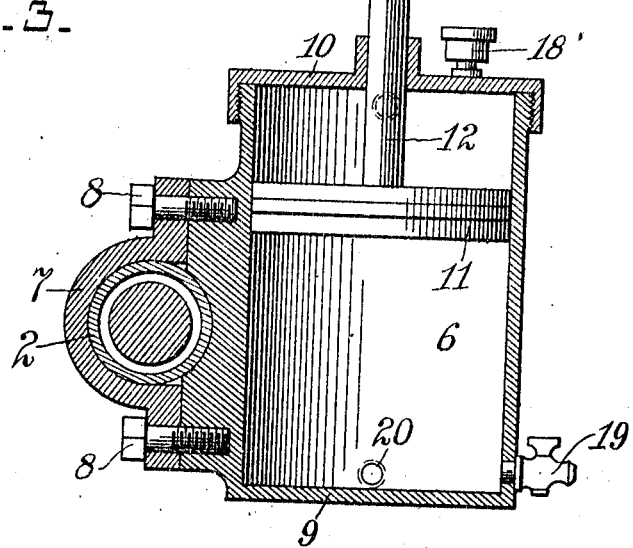
Witnesses
W. Siebler
H. S. Smith
Inventor
Payton West
By R. J. McCarty
his Attorney

UNITED STATES PATENT OFFICE.

PEYTON WEST, OF SPRINGFIELD, OHIO.

VEHICLE CUSHIONING DEVICE.

988,417.
Specification of Letters Patent.
Patented Apr. 4, 1911.

Application filed December 27, 1910. Serial No. 599,477.

*To all whom it may concern:*

Be it known that I, PEYTON WEST, a citizen of the United States, residing at Springfield, in the county of Clark and State of Ohio, have invented certain new and useful Improvements in Vehicle Cushioning Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cushioning devices for vehicles, to relieve the running gear of jolts or jars.

The object of the invention is to provide a cushioning device that may be attached to vehicles such as automobiles and will supplant the elastic action of the springs and pneumatic tires, thereby increasing the easy riding qualities of the vehicle.

In the accompanying drawings, Figure 1 is a rear elevation of the running gear of an automobile, the same being provided with my improved cushioning device; Fig. 2 is a section through one of the cylinders on the line *a—a* of Fig. 1; and Fig. 3 is a bottom plan view of the slide on the line *b—b* of Fig. 1.

Throughout the specification and drawings, similar reference characters indicate corresponding parts.

Referring more particularly to the drawings, 1 represents the front or rear wheels mounted on an axle 2. The axle 2 is attached to the running gear frame 3 by means of elliptical springs 4 which permit the body of the vehicle (not shown) to have a resilient motion when the vehicle is being propelled. The above described features are well known parts of motor vehicle constructions and constitute no part of the present invention.

To obviate the excessive resilient motion of the body of the vehicle, I provide a series of cylinders or dash-pots constructed, mounted and associated as follows. Mounted on the axle 2, which may be the front or rear axle; and adjacent to each of the springs 4, is a cylinder 6 attached to the axles in any convenient manner such as clips 7, which encompass the axle and are secured by screws 8. The said cylinders may be provided with integral bottoms 9 and removable heads 10. Reciprocating in each of said cylinders is a piston 11 joined to a piston rod 12 which extends upwardly through the removable head 10. On their upper ends, the piston rods 12 are attached at 13 to the socket members 14 of ball and socket joints. The cup members 14 encircle the ball members 15, which are provided with flanged portions 16 lying within bearings 17 attached to the frame 3 of the vehicle. The flanged portions 16 of the ball members 15 are slidably mounted in the bearings 17, so that when a side of the vehicle is on a plane above or below the other side, the piston rod will be prevented from binding or breaking, which would be the result if the flange 16 was not free to move, notwithstanding the other joint between the piston rod and the running gear. The ball and socket members constitute a universal joint between the running gear of the vehicle and the dash pot, which relieves the latter from any undue lateral strain.

When the vehicle is in motion, some of the shocks or jars due to the striking of obstructions will be absorbed or taken up by the springs 4, while the remainder of them will be absorbed by the air compressed within the cylinders below the piston 11. The ball and socket joints 14 and 15, which form the direct connection between the piston rods, and the flanged members 16, allow the cylinders to have a certain amount of free movement independent of the frame or running gear, and thus prevent the strains being communicated to the cylinders by the shifting of the frame. In other words, the constant shifting of the frame of the vehicle is prevented from straining the cylinders and piston rods.

The cylinders 6 may be provided with oil cups 18 in the removable heads thereof, and drain cocks 19 at the bottom thereof, to draw off any excessive accumulations of oil. The said cylinders may also be provided at the top and bottom with valves 20 for the purpose of adjusting the air pressure within said cylinders.

Having described my invention, I claim:

In a cushioning device for vehicles, the combination of a vehicle running gear, an air cylinder supported upon an axle of said running gear, a piston in said cylinder, a rod extending from said piston, a ball socket attached to the end of said piston rod, a ball member in said socket forming a universal joint therewith, said ball member terminating in an extended flange, and a bearing attached to the running gear frame and in which said flange is slidably mounted, and whereby there are provided two yielding joints between the running gear of the vehicle and the piston rod, substantially as and for the purposes specified.

In testimony whereof I affix my signature, in presence of two witnesses.

PEYTON WEST.

Witnesses:
HARRY A. BRENNER,
NELLIE C. TEHAN.